United States Patent [19]

Dike, Jr.

[11] 4,255,091
[45] Mar. 10, 1981

[54] STRUCTURAL UNIT FOR HYDRAULIC SYSTEMS

[75] Inventor: John H. Dike, Jr., Melrose, Mass.

[73] Assignee: Dike Equipment Corporation, Stoneham, Mass.

[21] Appl. No.: 9,478

[22] Filed: Feb. 5, 1979

[51] Int. Cl.³ .............................................. F04B 21/00
[52] U.S. Cl. ..................................... 417/63; 417/313; 417/360
[58] Field of Search ................ 417/234, 63, 244, 312, 417/313, 360, 572, 218; 60/325

[56] References Cited

U.S. PATENT DOCUMENTS

| | | | |
|---|---|---|---|
| 2,662,375 | 12/1953 | Postel et al. | 60/325 |
| 3,304,715 | 2/1967 | Page et al. | 60/325 |
| 3,433,415 | 3/1969 | Enssle | 417/234 X |
| 3,762,161 | 10/1973 | Pennig | 60/325 X |
| 4,178,139 | 12/1979 | Seppanen et al. | 417/360 |

FOREIGN PATENT DOCUMENTS 2804653 8/1979 Fed. Rep. of Germany ........... 417/313

Primary Examiner—Carlton R. Croyle
Assistant Examiner—Edward Look
Attorney, Agent, or Firm—Kenway & Jenney

[57] ABSTRACT

Disclosed is a versatile, compact, explosion resistant, noise reducing, leak-containing structural unit for housing and mounting a variable displacement hydraulic tranmission and its accessories. The structure comprises a protective housing having an access hatch, a hydraulic fluid reservoir integral with the housing, a mounting for receiving a variable displacement hydraulic transmission within the housing, and hydraulic pressure line couplings on the exterior of the housing for connection with a hydraulically driven device. The interior of the housing has mountings for a suction filter, a pressure line filter, relief valves, and a shuttle valve located to facilitate maintenance and promote safety. The transmission may be remotely controlled and is provided with shaft work from a prime mover located outside the housing. The structure, when fitted with suitable components, functions as an interface between any one of a variety of prime movers and a hydraulically driven rotary motion device.

19 Claims, 7 Drawing Figures

STRUCTURAL UNIT FOR HYDRAULIC SYSTEMS

BACKGROUND OF THE INVENTION

This invention relates to fluid power systems and more particularly to a free-standing structural unit for use with such systems that include a variable displacement hydraulic transmission.

Variable displacement hydraulic transmissions have now been commercially available for many years. Such devices are powered by a prime mover such as an electric motor, a turbine, or an internal combustion engine, and are capable of converting the constant speed shaft work input to a variable pressure, variable flow rate hydraulic output. These devices include a hydraulic, pneumatic, or electrical control device such as a stroker or servo mechanism through which the hydraulic flow rate can be varied from zero to maximum output. Transmissions of this type are well suited for use in powering a large variety of industrial hydraulically actuated tools and equipment because they allow power to be transmitted to remote locations without a mechanical power train, in either forward or reverse directions, at variable speed and/or variable torque. Further, they can provide dynamic breaking effects, an infinite number of hydraulic ratios (which allow engine power to be precisely matched to load conditions), and are not damaged when temporarily overloaded.

Such systems require a number of components in addition to the prime mover, the transmission, and associated hydraulic lines. Typical systems include a hydraulic fluid reservoir, a suction filter, and a heat exchanger. Preferably, a vacuum switch is included in the line between the suction filter and the transmission's charge pump to warn the operator when the suction filter is clogged. The high pressure lines which communicate between the transmission and the hydraulically driven device should each include a relief valve. Other components found in such systems include a shuttle valve installed in parallel with the transmission to provide for removal of the hot oil from the system, a pressure line filter, line pressure indicating devices, and flow turbines which read fluid flow rate.

As with most devices, hydraulic devices often have an exterior enclosure that supports component parts of the device and shields those components from damage. For example, U.S. Pat. No. 2,390,620 discloses a small, portable hydraulic driving device, and U.S. Pat. No. 2,662,375 describes a hydraulic transmission, both of which have conventional exterior enclosures. It is also known to provide a housing that serves additional functions such as noise reduction or storage or doubles as a housing for a hydraulic pump and a reservoir, in which case the pump is immersed in the oil. U.S. Pat. No. 3,885,892, for example, describes a specialized housing for a portable air compressor that reduces noise and vibration, has a built-in hose storage capability, and promotes both cool operation and handling convenience.

A complete system of the type described above necessarily includes a prime mover, a hydraulic pump, a hydraulically driven motor, and a machine driven by the motor. Heretofore, hydraulic systems have usually been individually designed to meet the requirements of a specific use, but subcombinations of the foregoing basic components, packaged as a unit together with associated filters, reservoir, and the like, on a skid or within an enclosure have also been available. A common example is a hydraulic power plant consisting of a prime mover and a hydraulic pump, packaged together to provide hydraulic power to several alternately used machine tools. Such systems are restricted to one prime mover, a single type of power coupling, and usually well defined output requirements. In particular, the transmission component of the system is usually designed to be driven by a specific prime mover, e.g., a diesel engine of a certain horsepower, and in turn to drive a specific hydraulic device or devices. In short, such subcombinations of components lack versatility.

Another commercially available combination of hydraulic components is the so-called "hydraulic transmission" consisting of a hydraulic pump, a hydraulically powered rotary motion device, and their associated equipment, packaged as a single unit. These are used, for example, in vehicle propulsion systems to transmit power from a diesel engine to the wheels.

In addition to a marked lack of versatility, the known systems have failed to solve the problem of simultaneously satisfying competing demands of containment and accessibility imposed on an exterior housing for a system that includes a hydraulic transmission. More specifically, it is highly desirable to contain leaks of hydraulic fluid or, more importantly for the safety of personnel working near the system, leaks or an explosion that could spray extremely hot oil carried at pressures typically in excess of thousands of p.s.i. On the other hand, it is also important to have ready access to the system for maintenance (such as the changing of filters), control, and monitoring of its functioning. The aforementioned "open" skid arrangement represents a choice in favor of accessibility and mobility at the expense of containment, safety, and compactness. More generally, no prior art system known to applicant provides a highly versatile hydraulic interface between a prime mover and a hydraulically driven device that contains leaks and explosions, and is compact, while at the same time providing a high degree of accessibility for regular maintenance, control, monitoring, and inspection.

SUMMARY OF THE INVENTION

In accordance with the invention there is provided a free-standing structural unit for use with a hydraulic system employing a variable displacement transmission. The outstanding advantage of the unit is that, when fitted with suitable hydraulic components, it is extremely versatile, safe, and compact, yet is designed to allow ready access for maintenance purposes. The structure provides noise reduction, mountings for various components in the system, and a failure-secure, hydraulic fluid leak-containing, compact housing which facilitates maintenance of components and isolates the system from its environment. These features enable the unit of the invention to be used as a module in a large variety of hydraulic systems designed for specific industrial purposes.

The structure comprises a protective housing defining an enclosure and having integral housing mountings and a sealable hatch which allows access to components for maintenance purposes. Contained within the housing are a hydraulic fluid reservoir comprising a separate enclosed compartment, mountings for a variable displacement hydraulic transmission, and preferably, at least one hydraulic fluid filter. The structure also includes means for delivering shaft work to the transmission through an exterior wall of the housing, means for connecting the hydraulic lines of a hydraulically driven device to the exterior of the housing, and means for transmitting a control signal from outside the housing to the output control of the transmission.

Optionally, the structural unit includes means for mounting a line filter and a suction filter within the housing. The suction filter mount is operable to locate the filter such that its intake port is disposed within the reservoir, and its coupling for connection with a charge pump intake line is disposed within the housing adjacent the exterior of the reservoir. The line filter mounting means preferably comprises a pocket on the exterior of the housing operable to receive a replaceable line filter element. The structure may further include means for mounting a heat exchanger, preferably located on the exterior of the housing and having connections passing through a wall of the housing in hydraulic communication with the reservoir. A line pressure indicator and a charge pump pressure indicator, each comprising and a pressure display visible from outside the housing may also be furnished. Lastly, a preferred structure includes means for measuring the change in the pressure across the filters and for transmitting a signal indicative of the pressure change to a point exterior to the housing.

The preferred structure includes integral mountings for all components of the hydraulic system (except the hydraulic motor and lines communicating therewith) and provides protection for pressurized lines, couplings, valves, etc. in a compact, easily serviced housing. Accordingly it may be coupled to any one of a variety of prime mover of various horsepower rating (e.g. 5–500) by either an in-line or belt drive arrangement, and to any one of a variety of hydraulically driven devices. To illustrate its compactness, the ratio of its volume to power output is at least about 2.5 Hp/ft$^3$, and preferably at least 12 Hp/ft$^3$.

Accordingly, objects of the invention include the provision of a quiet, safe, leak-containing, compact mounting and housing structure for use with a hydraulic circuit of the type utilizing a variable displacement hydraulic transmission. Another object of the invention is to package certain hydraulic components of the type described in an easily maintained, explosion resistant, compact structure which isolates certain high pressure lines and components from the surrounding environment, yet allows an operator to remotely control and determine the state of the system. Yet another object of the invention is to provide such a structure which, when fitted with suitable, commercially available hydraulic components, comprises a complete, or "turn key" drive system which may be coupled to any one of a number of different prime movers and to a wide variety of hydraulically driven rotary motion or reciprocating device.

These and other objects and features of the invention will be apparent from the following description of a preferred embodiment and from the drawing wherein various dimensions have been exaggerated and various components schematically represented for purposes of clarity.

BRIEF DESCRIPTION OF THE DRAWING

Like reference characters in the respective figures indicate corresponding parts.

DESCRIPTION OF THE PREFERRED EMBODIMENT

Any hydraulic rotary motion system for the transmission of fluid power necessarily includes as basic components a prime mover (that is, an engine that converts some form of energy to rotary motion), a hydraulic pump which converts the output of the engine to fluid pressure, a device driven by the fluid pressure which converts the pressure to rotary motion, and a machine which utilizes the rotary motion of the hydraulically driven device to effect useful work. With the advent of the variable displacement pump, precisely controllable via a stroker or servo mechanism, an efficient means of precisely controlling the work done by the machine became available.

The invention is based on the realization that a certain subcombination of hydraulic components used in this type of system can be packaged in a free-standing structural unit which will be useful in a wide variety of different hydraulic systems and have other significant advantages as disclosed herein. As used herein, the phrase "free-standing" means that the unit is a discrete structure which may be mounted as desired on a skid or support surface, but is otherwise unconnected with other components with which it is used, except for control and rotary motion inputs and hydraulic fluid outputs. Thus, for example, the packaged "hydraulic transmissions" and hydraulic power plants discussed above are not within the scope of this invention. The "free-standing" nature of the structural unit of the invention is important because it contributes heavily to its outstanding versatility.

Figure 1:
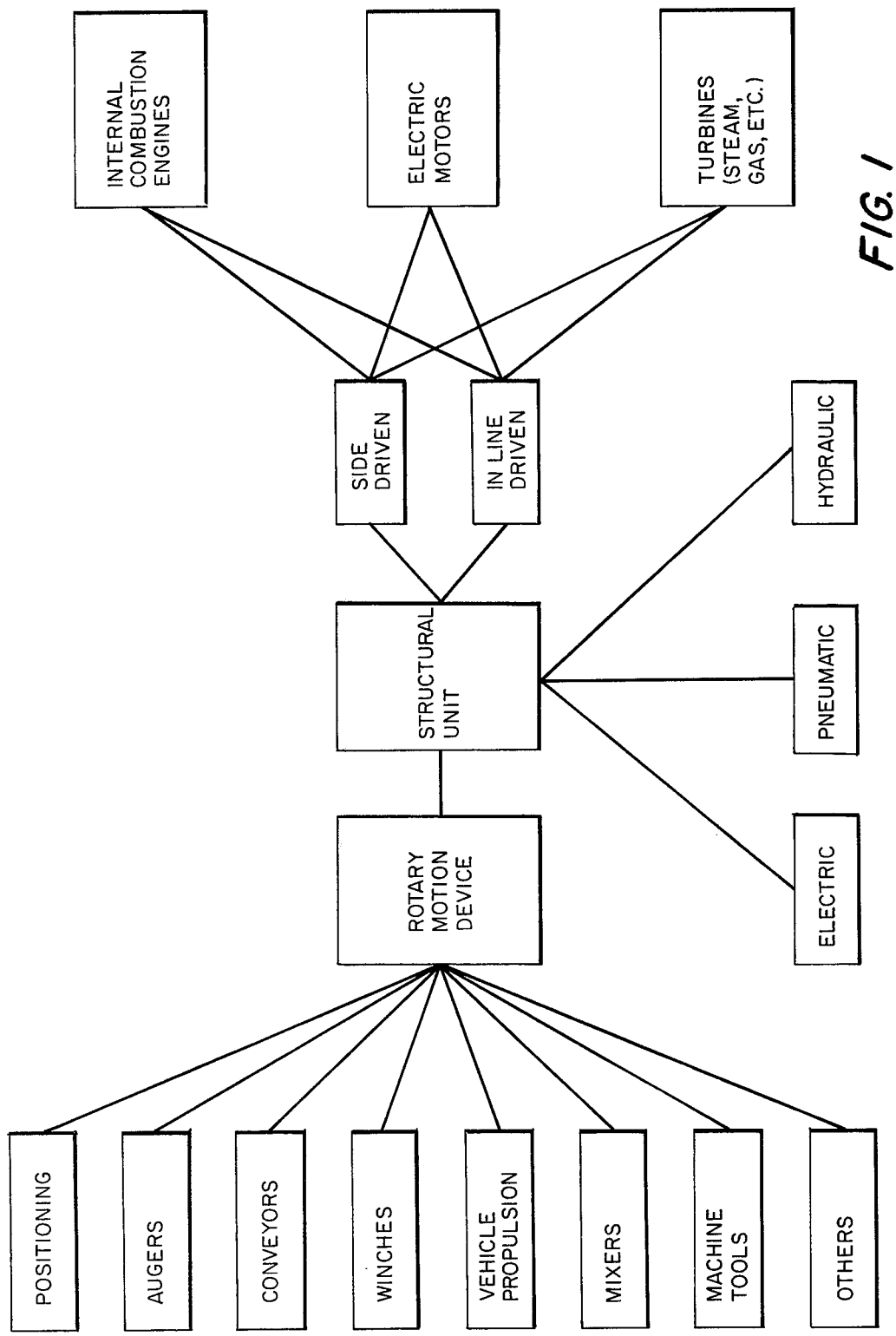
FIG. 1 is a block diagram illustrating the versatility of the structure of the invention.

The versatility of structures embodying the invention can be understood by reference to FIG. 1 of the drawing. As illustrated, the unit of the invention may be provided with shaft work, transmitted via either a side drive or an in-line drive, from internal combustion engines, electric motors, or turbines. These prime movers can be of various sizes, ranging in a preferred embodiment from 5 to 500 horsepower. If desired, a gear-box may be employed to increase or decrease the prime mover's shaft speed, as may be necessary for particular applications. The hydraulic output of the structural unit of the invention is used to drive a rotary motion device which can be selected to suit the particular machine to be powered. Control may be exerted over the system either electrically, pneumatically, or hydraulically.

Thus, the designer of a system for powering the machines listed as examples in FIG. 1 need only select a suitable mode of control, prime mover, and a rotary motion hydraulically driven device. These are connected to the structural unit as disclosed herein, and the system is operational.

Figure 2:
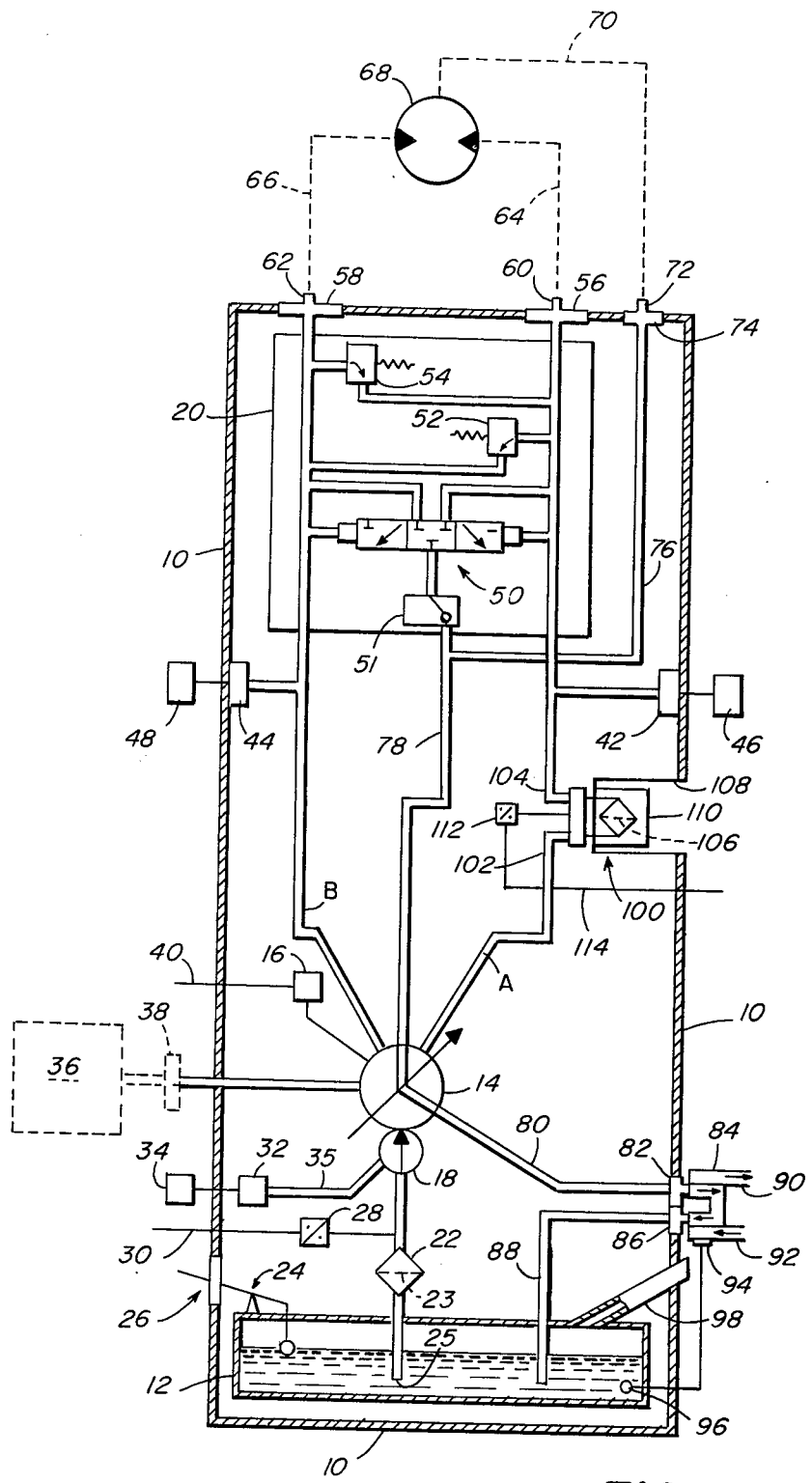
FIG. 2 depicts an exemplary hydraulic circuit schematically illustrating the relationship in accordance with the invention between various components in the circuit and the housing.

Referring to FIG. 2, a schematic diagram illustrating a hydraulic circuit and components which are mounted in association with the structural unit for the invention is shown. A housing, here represented as a generally rectangular box 10, contains an enclosed hydraulic fluid reservoir 12, a variable displacement hydraulic transmission 14 having a controller 16 and a charge pump 18, a relief and shuttle valve package 20, a suction filter 22, and various hydraulic lines and couplings. A hydraulic fluid level indicator 24 displays the level of fluid in reservoir 12 at a point visible from the exterior of housing 10 at 26. Hydraulic fluid drawn from the reservoir by charge pump 18 passes through the filter element 23 of suction filter 22, which has an inlet port 25 disposed within reservoir 12. A vacuum switch 28 within the housing transmits a signal which is indicative of the condition of the filter to a point exterior to the housing via electric line 30. A pressure gauge and/or switch 32 measures the pressure within charge pump 18 via line 35, and transmits a signal indicative of the pressure to a display 34 outside the housing.

Variable displacement pump 14 is powered by a prime mover 36 such as a diesel engine, electric motor, steam turbine, etc. of a desired power rating. The shaft work may be delivered to the transmission through the housing by an in-line approach, e.g., by means of a flexible coupling 38 as shown, or by a side mounted belt or chain drive. The transmission's controller 16 can comprise a hydraulic, electric, or pneumatic stroker or an electro-hydraulic servo mechanism. It is actuated from outside the housing 10 via line 40. The hydraulic output of transmission 14 passes through lines A and B, both of which are fitted with pressure transducers 42 and 44 connected to visual displays 46 and 48 located outside the housing 10. Each of lines A and B pass through valve package 20 which contains a shuttle valve 50, a charge pump relief valve 51, and pressure line relief valves 52 and 54. Lines A and B are coupled to output connections 56 and 58 which penetrate the housing and include exterior couplings 60 and 62.

Hydraulic lines 64 and 66 communicate between output couplings 60 and 62 and a hydraulically driven device, here illustrated as a hydraulic motor 68 having a case drain 70. The case drain line is attached to coupling 72 on the outside of the housing. Hydraulic fluid from the case drain passes through housing connector 74 and line 76 to shuttle valve and charge pump relief valve return line 78. Prior to its return to reservoir 12, the hydraulic fluid from line 78 passes through line 80, heat exchanger coupling 82 mounted on housing 10, heat exchanger 84, coupling 86, and return line 88. Heat exchanger 84 is provided with cooling fluid, typically air or water, through inlet 90 and outlet 92, and is controlled by a thermostat 94 and its associated temperature sensor 96 disposed within the hydraulic fluid in reservoir 12. A reservoir filler and breather port 98 communicates between reservoir 12 and the exterior of housing 10.

Line A also features a line filter mechanism generally designated at 100. The filter mechanism comprises pressure line connections 102 and 104 within the housing and a filter element 106 located in a pocket 108 of the housing. The filter element has a removable cover 110 accessable from the exterior of housing 10 to facilitate replacement of filter element 106. A delta pressure switch 112 provides a signal indicative of the pressure drop across filter element 106 via line 114 to the exterior of the housing. The signal may be used to turn on a warning light or the like to indicate that filter element 106 should be replaced.

As can be appreciated from FIG. 2, all components through which pressurized hydraulic fluid flows, with the exception of line filter element 106 (which is disposed within its own housing) and the hydraulic lines leading from the housing to the hydraulically driven device 68, lie within the protective enclosure. Obviously, various optional components may be eliminated from the circuit and additional components may be included as required for specific applications.

An important embodiment of the invention is disclosed in FIGS. 3 through 7. Housing 10 is embodied as a generally cubical structure, e.g., $2' \times 2' \times 2'$, having side walls 116, 118, 120 and 122, base 124, and top 126 fitted with an access hatch 128 mounted on a hinge 130. The interior of the housing is lined with conventional sound attenuating material 121. The access hatch has a plurality of hatch locking flanges 132 by means of which the hatch may be secured with bolts. The base of the sidewalls of housing 10 have integral housing mounts 134 for securing the structure to a skid or the like with bolts. The interior of the housing includes an integral reservoir 12 defining a closed compartment 136 having a hydraulic fluid filler port 138 and a breather cap 140. A hydraulic fluid level indicating device 142 has a display 26 visible from the exterior of the housing. The housing is preferably constructed of 3/16 inch (or thicker) steel plate with welded seams, mounts, and hatch locking flanges.

Figure 3:
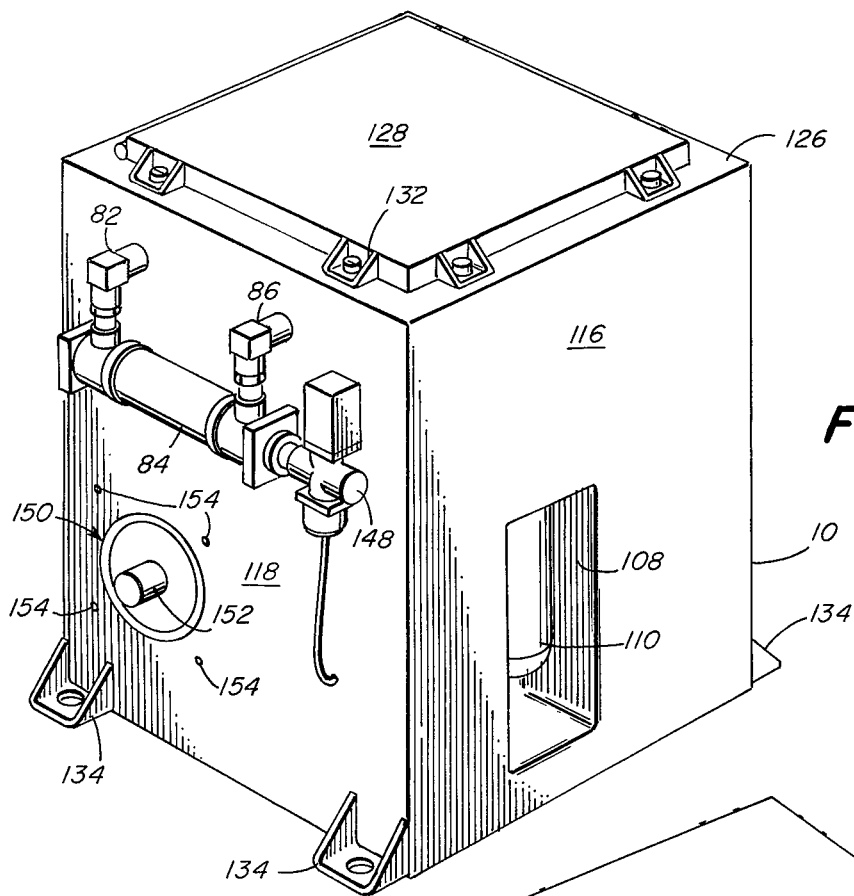
FIG. 3 is a first perspective view of a device embodying the invention.
Figure 4:
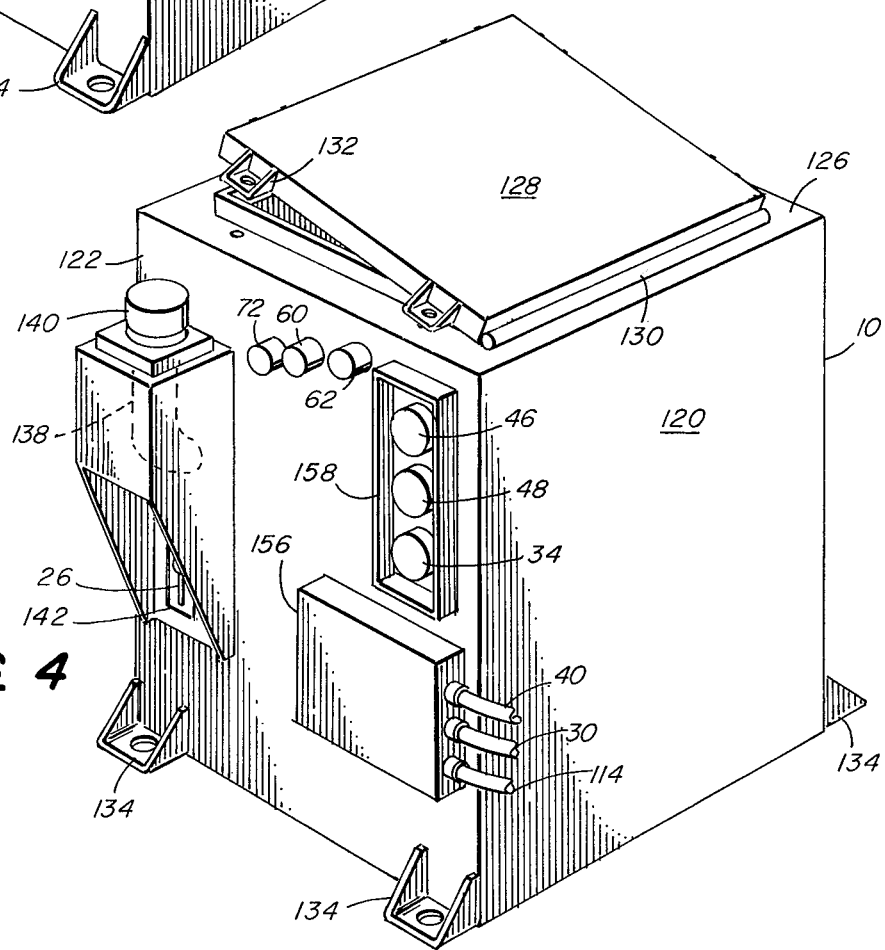
FIG. 4 is a second perspective view of the device of FIG. 3.
Figure 7:
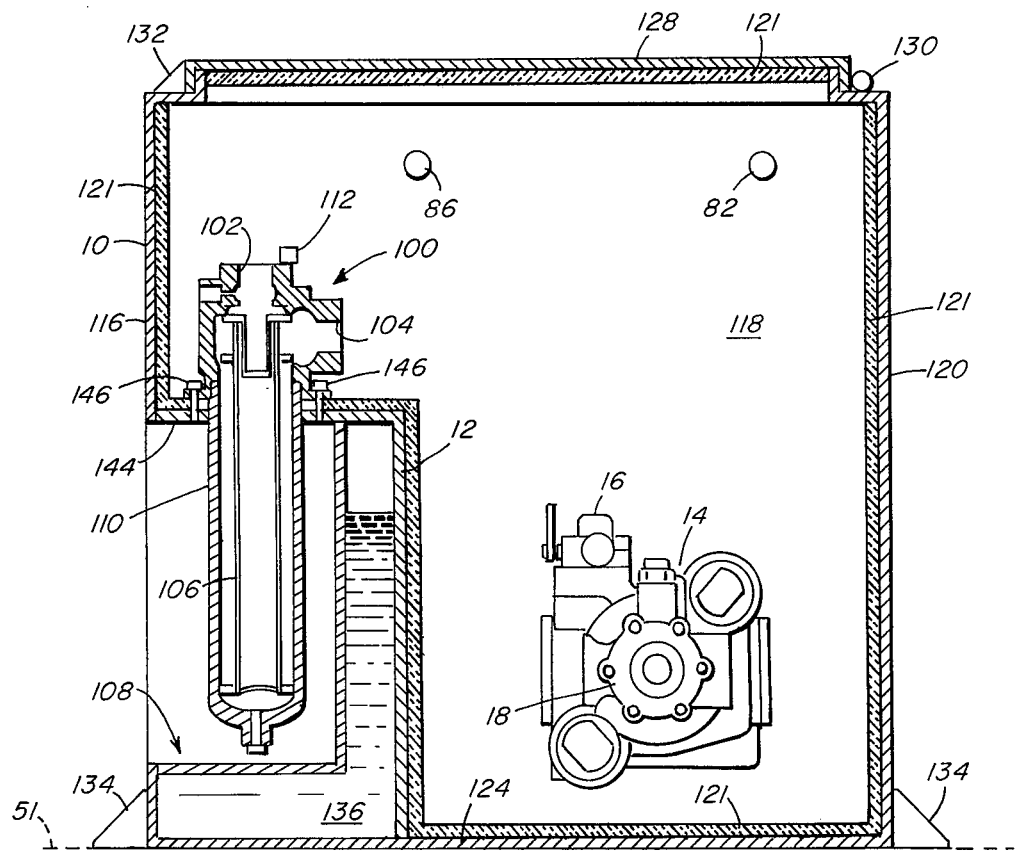
FIG. 7 is a cross-sectional view of the device of FIG. 5 taken along line 6—6.

As shown in FIGS. 3 and 7, sidewall 116 features a pocket 108 for receiving the cover 110 of a line filter element 106. As best seen in FIG. 7, line filter 100 is mounted on the top wall 144 of pocket 108 so that hydraulic couplings 102 and 104 are disposed within the housing 10.

Sidewall 118 (FIGS. 3 and 7) features couplings 82 and 86 for mounting a heat exchanger 84, here shown as a water cooled unit, on the exterior of the enclosure. A thermostat 148 serviced by a temperature sensing device (not shown) in contact with the hydraulic fluid within reservoir 12 controls the heat exchanger 84 so as to maintain a selected hydraulic fluid temperature level. Exterior mountings for the heat exchanger are preferred since this allows either water cooled or the bulkier air cooled units to be employed.

Sidewall 118 also includes a variable displacement transmission mounting 150 for transmitting shaft work through wall 118 to transmission 14. Mounting 150 comprises a hole through which the transmission's drive shaft 152 protrudes for coupling with a prime mover, and bolt holes 154 for mating with the bolts of mounting flange 156 of the transmission.

Sidewall 122 (FIGS. 4 and 6) have an integral pair of pressure line couplings 60 and 62, penetrating the housing, for connection with hydraulic lines for delivering hydraulic power to a driven device such as that shown schematically in FIG. 2 at 68. A case drain line coupling 72 passes through the housing. A relief and shuttle valve package 20 is mounted on the interior of housing sidewall 112 in communication with (preferably directly on) couplings 60 and 62. The valve package includes couplings 60' and 62' for receiving pressurized hydraulic lines A and B.

Sidewall 122 also has an integral electrical box 156 for coupling the output of line 114 from line filter delta switch 112 and line 30 from suction filter pressure switch 28 to display devices (not shown) such as audio or visual alarms or safety switches which are actuated when the line filter element 106 or suction filter element 23 need replacement. Box 156 also serves as the point of entry of transmission control line 40. Line 40 can comprise a hydraulic or pneumatic line, if the control device of the variable displacement transmission 14 comprises a hydraulic or pneumatic stroker, or an electric line for controlling an electric stroker or a servo mechanism. Each of lines 40, 30 and 114 penetrate housing sidewall 122 at 40', 30', and 114' (FIG. 6) and are connected within the interior of housing 10 as illustrated in FIG. 2. The exterior of sidewall 122 also features line pressure displays 46 and 48 and charge pump pressure display 34 located within a protective bracket 156 which may be fitted with a cover (not shown). Pressure transducers 42 and 44 feed the displays 46 and 48. Transducer 32 feeds charge pump display 34.

Figure 5:
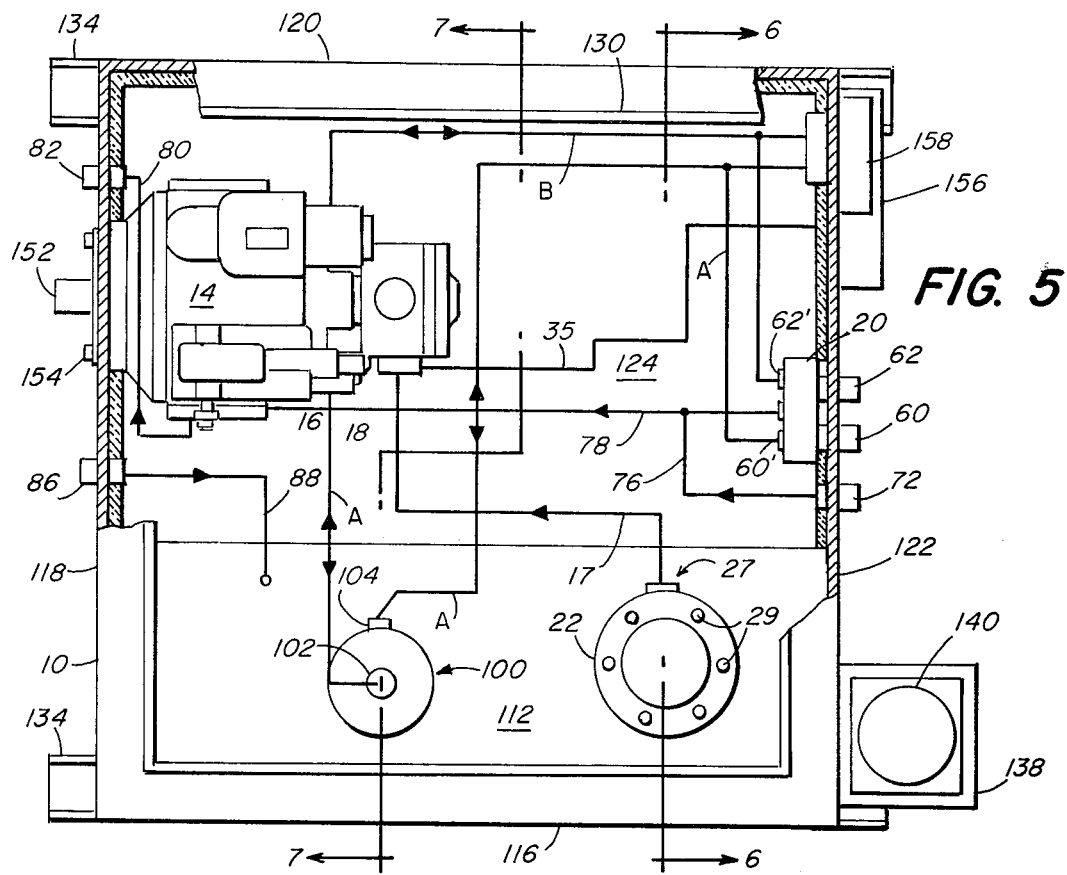
FIG. 5 is a partially broken away, top plan view of the device of FIG. 3 schematically illustrating the hydraulic piping within the enclosure.
Figure 6:
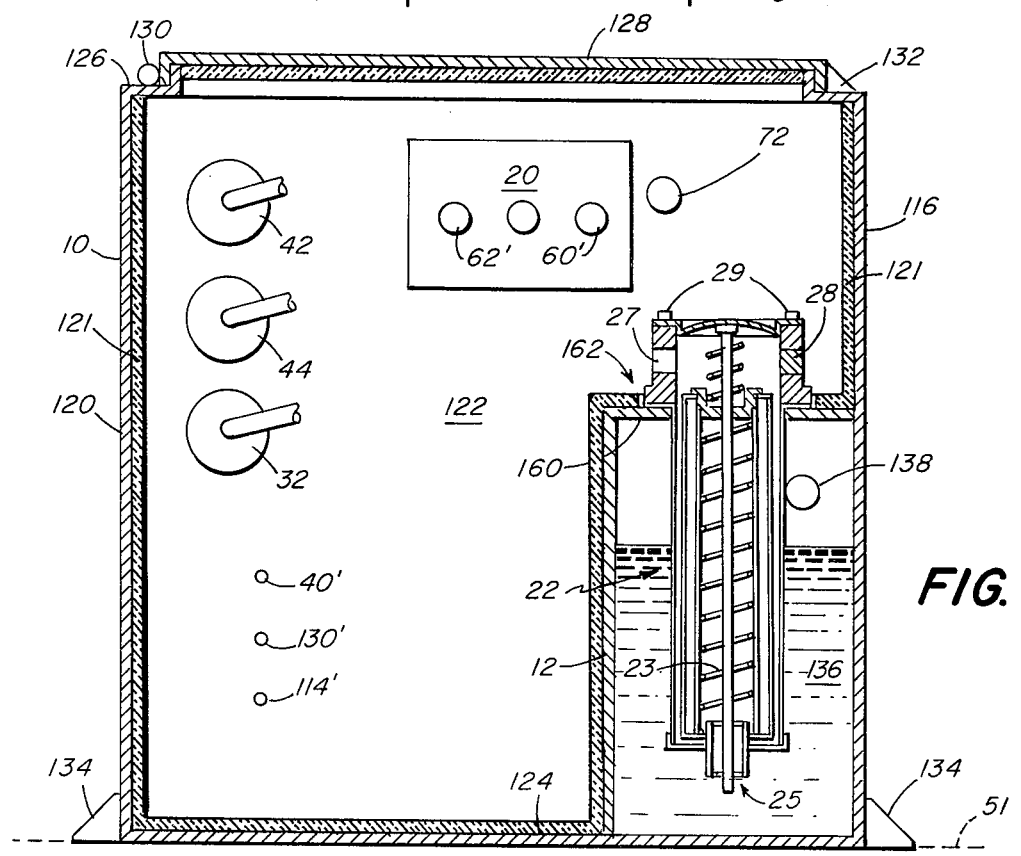
FIG. 6 is a cross-sectional view of the device of FIG. 5 taken along line 5—5.

As shown in FIGS. 5 and 6, the top wall 160 of reservoir 12 includes a mounting 162 for suction filter 22 which comprises a filter element 23, a hydraulic fluid intake port 25, a coupling 27 for connection with charge pump 18, and a vacuum switch 28. The suction filter mounting comprises an opening in the top wall 160 through which the filter element projects and a series of threaded bolt holes for receiving bolts 29.

While the embodiment illustrated in the drawing shows a variable displacement hydraulic transmission comprising a single pump having output lines A and B, it will be apparent to those skilled in the art that commercially available transmissions featuring a second, typically lower capacity transmission (not shown) driven by the same drive shaft 152 and mounted onto the rear of the main transmission 14 may be employed. The second or auxiliary transmission would have an independent control, output lines, etc., but can share the same reservoir. Of course, a second set of output connections similar to those shown at 60 and 62 would be required in this situation.

In operation, with commercially available components of the type disclosed above mounted as shown in the various drawings, the housing of the invention is mounted on a support 51, access hatch 128 is bolted shut, a selected prime mover is connected to shaft 152, and the case drain and pressurized hydraulic lines of a selected hydraulically driven device are connected to couplings 72, 60, and 62 on sidewall 122 of housing 10. A preferred pressure line filter element has a pore size of 3 microns; a preferred suction filter element has a pore size of 10 microns. Lines 30 and 114 are connected to a display panel to actuate warning lights or the like, and line 40 is connected to a manually, electrically, or mechanically actuated device which allows remote control of transmission control device 16. The pressure in lines A and B and in the charge pump 18 may be read at displays 46, 48, and 34. The hydraulic fluid level in reservoir compartment 136 may be read on level indicator 26. Hydraulic fluid, as needed, is supplied to the reservoir via filler port 138. A prime mover of a selected horsepower rating, such as gas turbine, electric motor, or the like is connected to the shaft 152. The power rating of the prime mover is selected in accordance with the requirements of the particular hydraulically powered device with which the apparatus is used. Since the housing contains a shuttle valve and relief valves for the pressure lines, hydraulically driven devices with or without these valves may be attached to the output couplings 60 and 62.

Advantageously, all pressurized components in the system, with the exception of the hydraulic lines leading from the housing and the hydraulically driven device itself, are located within the protective environment of the structure of the invention. Thus, if the system develops leaks, hydraulic fluid is contained. In the event of serious failure of a pressurized coupling, line, etc. located within the housing, the hot, pressurized hydraulic fluid, whipping hydraulic hoses, and the like are confined so that personnel and property exterior to the housing are protected. Furthermore, the housing provides significant noise reduction, especially if sound attenuating material such as is depicted at 121 is used to line the enclosure. Because the structure is compact, failure secure, and includes mountings for all the required peripheral equipment normally used with variable displacement hydraulic transmissions, the system acquires a degree of versatility heretofore not possible. To illustrate the compactness of the system, it may be noted that the foregoing structure, in the currently manufactured commercial embodiment depicted herein, has a total volume on the order of eight cubic feet. Since up to about 160 horsepower can be put through the hydraulic system, the power to volume ratio of the structure is on the order of 20 Hp/ft$^3$.

In view of the foregoing, those skilled in the art will appreciate that various changes and modifications can be made in the apparatus described above without departing from the scope and spirit of the invention. Accordingly, other embodiments are within the following claims.

What is claimed is:

1. A free-standing structural unit for use in a hydraulic system of the type including a variable displacement hydraulic transmission having a hydraulic output control, said structure being adapted for use with a variety of prime movers and hydraulically driven devices and comprising:

a protective housing defining an enclosure having housing mounting means and an access hatch;

a hydraulic fluid reservoir comprising an enclosed compartment within the housing;

means for mounting a variable displacement hydraulic transmission within the enclosure exterior to said reservoir;

means penetrating a wall of the housing for delivering shaft work to the transmission from any one of a variety of prime movers located exterior thereto;

means penetrating a wall of the housing for connecting the hydraulic lines of any one of a variety of hydraulically driven device to the exterior of the housing;

means penetrating a wall of the housing for transmitting a control signal to the output control of said transmission; and means for mounting a filter in a hydraulic line within said enclosure, located to facilitate access to said filter.

2. The unit of claim 1 wherein the filter mounting means comprises means for mounting a suction filter, said filter mounting means being operable to locate a suction filter such that its hydraulic fluid intake port is disposed within said reservoir and its coupling for connection with a charge pump intake line is disposed within the enclosure on the exterior of said reservoir.

3. The unit of claim 1 further comprising means for mounting a shuttle valve and a relief valve within said enclosure in hydraulic communication with said connecting means.

4. The unit of claim 1 wherein said filter mounting means comprises means for mounting a line filter within said enclosure in hydraulic communication with said connecting means.

5. The unit of claim 1 wherein said filter mounting means comprises a pocket on the exterior of said housing operable to receive a replaceable filter element whereby a filter element may be replaced from the exterior of said housing.

6. The unit of claim 1 further comprising means for mounting a heat exchanger for cooling hydraulic fluid.

7. The unit of claim 6 wherein said means for mounting a heat exchanger is located on the exterior of said housing and includes conduit means in hydraulic communication with said reservoir.

8. The unit of claim 1 further comprises a hydraulic fluid filler port and a hydraulic fluid level indicator having a display on the exterior of said housing.

9. The unit of claim 1 further comprising line pressure indicating means comprising pressure display means located exterior to said housing.

10. The unit of claim 1 further comprising a charge pump pressure indicating means comprising pressure display means located exterior to said housing.

11. The unit of claim 1 further comprising a filter mounted within said enclosure on said filter mounting means, means for measuring the change in pressure across said filter, and means penetrating a wall of the housing for transmitting a signal indicative of the pressure change to a point exterior to said housing.

12. A compact, free-standing structural unit for use in a hydraulic system of the type including a variable displacement hydraulic transmission, said structure being adapted for use with a variety of prime movers and hydraulically driven devices, and comprising:
 a protective housing defining an enclosure and having housing mounting means and an access hatch;
 a hydraulic fluid reservoir comprising an enclosed compartment within the housing;
 means for mounting a variable displacement hydraulic transmission within the enclosure exterior to said reservoir;
 means penetrating a wall of the housing for delivering shaft work to the transmission from any one of a variety of prime movers located exterior thereto;
 means penetrating a wall of the housing for connecting hydraulic fluid lines between said transmission and a point exterior to the housing; and
 means for mounting a filter within said housing in a hydraulic line between said reservoir and said transmission, said unit having a horsepower to volume ratio of at least 2.5 Hp/ft$^3$.

13. The unit of claim 12 further comprising means penetrating a wall of the housing for delivering a signal indicative of the change in pressure across a filter mounted on said filter mounting means to a point exterior thereto.

14. The unit of claim 12 further comprising means for mounting a line filter having a replaceable filter element, said line filter mounting means being located in a pocket on the exterior of said housing so that said changeable filter element projects exterior to said housing into said pocket.

15. The unit of claim 14 further comprising means penetrating a wall of the housing for delivering a signal indicative of the change in pressure across a line filter mounted on said line filter mounting means to a point exterior to the housing.

16. A free-standing structural unit for mounting and protecting against the explosive failure of pressurized components in a hydraulic circuit of the type including a variable displacement hydraulic transmission having an output control, a relief valve, and a shuttle valve, said structure comprising:
 an explosion resistant housing defining an enclosure and having housing mounting means and a sealable access hatch;
 a hydraulic fluid reservoir comprising an enclosed compartment within the housing;
 means for mounting a variable displacement hydraulic transmission within the enclosure exterior to said reservoir;
 means penetrating a wall of the housing for delivering shaft work to the transmission from any one of a variety of prime movers located on the exterior of said housing;
 means for connecting the hydraulic lines of any one of a variety of hydraulically driven devices to the exterior of the housing, including means penetrating a wall of said housing for connection with a variable displacement transmission mounted in said enclosure;
 relief valve mounting means and shuttle valve mounting means within said enclosure positioned to allow installation of a relief valve and a shuttle valve in hydraulic lines between a hydraulic transmission mounted in said enclosure and a portion of said connecting means disposed within said enclosure;
 means penetrating a wall of the housing for transmitting a control signal from outside said housing to the output control of a hydraulic transmission mounted therewithin; and
 means for mounting a filter in hydraulic lines within the enclosure, located to facilitate access to said filter.

17. The unit of claim 16 wherein said housing comprises sound attenuating material.

18. The unit of claim 16 further comprising a line pressure indicating means comprising pressure display means located exterior to said housing.

19. The unit of claim 16 wherein said filter mounting means is operable to position a replaceable filter element in a pocket on the exterior of said housing.

* * * * *